July 10, 1934.   C. VALLONE   1,965,785
SWING
Filed Feb. 5, 1932
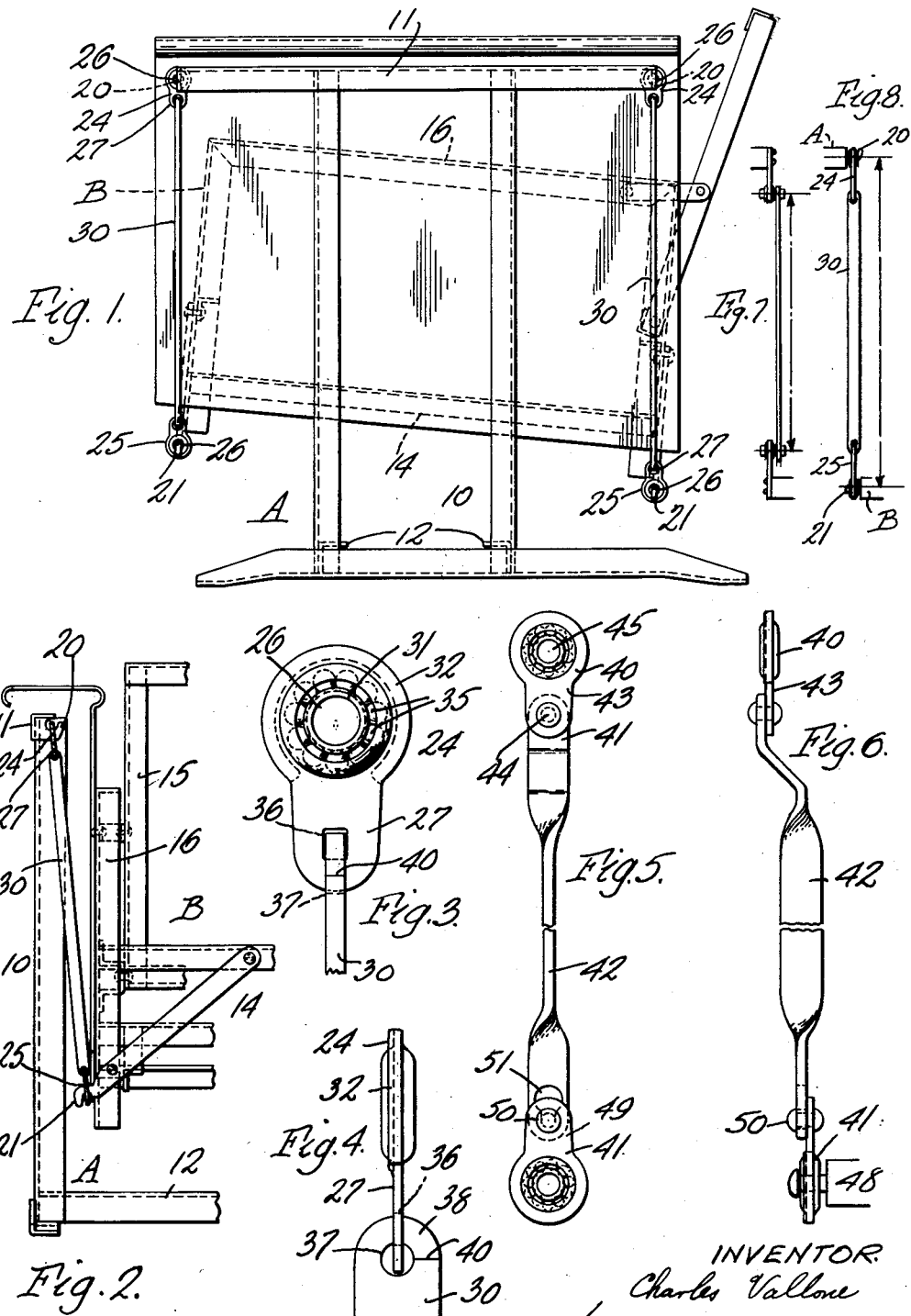
INVENTOR.
Charles Vallone
by Parker, Pricknow & Farmer
ATTORNEYS.

Patented July 10, 1934

1,965,785

UNITED STATES PATENT OFFICE 1,965,785

SWING

Charles Vallone, Buffalo, N. Y., assignor to Barcalo Manufacturing Company, Buffalo, N. Y.

Application February 5, 1932, Serial No. 591,014

2 Claims. (Cl. 5—129)

This invention relates to improvements in swings, and particularly in swings of the sort known as gliders, which usually comprise a stationary supporting frame having spaced upright side members and a movable seat arranged between said members and suspended thereon so as to swing in a fore and aft direction between said side members.

In some of these swings or gliders, as heretofore constructed, the seat is suspended from the side members of the frame by suspension means comprising links or analogous members, the ends of which have been pivotally connected to ball or anti-friction bearings secured to the frame side members and to the seat respectively. In such devices, the distance between the axes of the pivot bearings at opposite ends of the links is less than the distance between the points of attachment of the bearings to the seat and frame respectively, so that the effective length of the swinging links is equal only to the distance between the axes of said bearings and less than the distance between the points of attachment of the suspension means to the frame and seat.

The objects of the present invention are to provide a practical and economical construction for a swing or glider of the sort mentioned in which the suspension elements have anti-friction bearing connections with the frame and seat and the effective swinging length of the suspension elements for the seat between the axes of their frame and seat bearings is considerably increased without increasing the height of the supporting frame or the distance between the points of attachment of the suspension means to the frame and seat, so that the seat may have a greater swinging movement than is possible in swings of like height as heretofore constructed and having the same distance between said points of attachment; also to provide suspension means for swings or gliders having improved means of attachment between the suspension links or members and their bearings.

Various other objects and advantages will be apparent from the following description of the invention, and the novel features will be particularly pointed out in connection with the appended claims.

In the drawing:

Fig. 1 is a side elevation of a swing or glider illustrating one practical embodiment of my invention.

Fig. 2 is a fragmentary rear elevation of one end of the structure.

Fig. 3 is an enlarged, fragmentary side elevation, illustrating the upper end of one of the suspension links.

Fig. 4 is a view thereof taken at right angles to Fig. 3.

Fig. 5 is a side elevation, partly broken away, of a suspension link illustrating another embodiment of my improved suspension means.

Fig. 6 is a view thereof taken at right angles to Fig. 5.

Figs. 7 and 8 are diagrammatic views illustrating respectively a known suspension means for gliders, and my improved suspension means to show by comparison the greater effective length of the swinging suspension elements of the present invention for a given distance between the parts of the frame and seat to which the suspension means are attached.

With the exception of the suspension means for the seat, the swing or glider may be of any usual or suitable construction.

Such parts of a glider swing as are necessary to an understanding of this invention are shown in Figs. 1 and 2. The swing comprises a stationary supporting frame A and a swinging seat B. As illustrated, the frame A includes opposite side or end uprights or members 10 which are suitably fabricated of angle bars or the like including a transverse horizontal top rail 11. The side members may be rigidly connected at their lower ends by longitudinal parallel rails 12 extending beneath the suspended seat B.

The seat B may be of any suitable construction. As shown, it includes a bottom, substantially horizontal rectangular frame 14, an upright back 15 and upright side or end members 16, extending parallel with and spaced from said side members 10 of the frame A.

The seat B is suspended so as to swing in a fore and aft direction; that is, parallel with the side members 10 of the frame A preferably by four suspension units connecting the four corners of the seat frame 14 with appropriate parts of the side uprights of the stationary frame A. In the construction herein illustrated, the two suspension units at each end of the seat B extend between the front and rear corners of that end and the front and rear ends respectively of the horizontal top rail 11 of the adjacent frame member 10, being connected at their upper ends to suitable lateral pivot projections provided at the front and rear ends of the horizontal top rail 11 of the frame A and extending inwardly toward the seat B, and at their lower ends to corresponding lateral pivot projections extending outwardly toward the end frame member 10 from the front and rear corners of the seat.

The pivot projections on the stationary frame A are shown as consisting of laterally extending, upwardly facing hooks 20 formed by integral inbent front and rear end portions respectively of each of the top rails 11, while the pivot projections on the seat are in the form of integral, downwardly facing hooks 21 on corner braces of the seat frame. The pivots 20, 21 could be formed by separate studs or other suitable members secured to the frame A and seat B, if desired.

The four suspension units are of similar construction so that the description of one of the units will suffice to disclose the invention.

Each suspension unit, as shown in Figs. 1 to 4, includes upper and lower anti-friction bearings or bearing units 24 and 25 each having an aperture 26 for the reception of the upper or lower pivot 20 or 21 respectively on the frame A and seat B, and each of which bearings is provided with a lug or part 27 extending towards the other bearing, that is to say, the lug on each upper bearing 24 is directed downwardly while the lugs of the lower bearing 25 project upwardly. These lugs 27 are in turn connected to the opposite ends of a link 30 which is preferably formed of a flat metal bar.

The bearings 24 and 25, shown, are relatively thin or flat in the direction of the axes of the bearings and in each of said bearings the aforesaid pivot-receiving aperture 26 is formed in an inner annular member 31 surrounding and in spaced relation to which is an outer annular member 32, the latter having the extension or lug 27 formed thereon. The inner and outer annular members 31 and 32 are provided with opposed circular race-ways concentric with the axis of the aperture 26 and between which is disposed a plurality of bearing balls or rolling anti-friction elements 35. This arrangement permits the outer annular member 32 to oscillate freely and quietly on the inner member.

The link 30 is preferably so connected to the lugs or projections 27 of the bearings at its opposite ends as to prevent substantial relative movement between the link and said outer bearing members 32 in the fore and aft direction of movement of the seat B. For this purpose, in the construction shown in Figs. 1 to 4, the lugs 27 are each formed with a rectangular opening 36, and the adjacent end of the link 30 is provided with an aperture 37, preferably circular, thus leaving between said aperture 37 and the end of the link a portion 38 of rectangular cross section. This portion 38 is adapted to be received in the rectangular opening 36 in the bearing lug 27, which opening is only slightly larger in area than the cross sectional area of the part 38 so that relative movement between the attached parts in the plane in which the suspension unit swings is very slight. In order to permit the end portions 38 of the link to be inserted into the apertures 36 of the lugs 27, the ends of the links may be split from each aperture 37 to an edge of the link, as shown at 40, Fig. 4, so that each extremity of the link may be bent laterally to permit it to be passed through one of the apertures 36, after which said extremity of the link can be straightened or restored to its former condition thereby retaining the link and bearing member 22 in connection. The circular form of the apertures 37 in the ends of the link allow sufficient flexibility between the link and the attached bearing members 32 in the direction of the axes of the bearings to prevent binding or cramping of the bearings due to endwise swaying of the seat.

In the swinging movements of the seat, the suspension units, by reason of the described construction, oscillate about the axes of the upper bearings 24 and lower bearings 25 since the described connection between the links 30 and the respective bearing members 32 prevents any material relative movement therebetween. Thus, antifriction bearings are provided for the opposite ends of the swinging suspension units, and instead of the effective length of the suspension units being restricted to the distance between the connections of the links 30 with the bearing members 32 at their opposite ends, as is the case in prior constructions, such as illustrated in Fig. 7, the effective length of each swinging suspension unit is increased at each end thereof by the distance between said connections and the axes of the bearings 24 and 25, as illustrated in Fig. 8.

While, at present, I prefer to construct the suspension means as just described, other effective and practical arrangements can be used.

For example, in Figs. 5 and 6, I have shown upper and lower antifriction bearings 40 and 41 which are substantially similar to the bearings 24 and 25 of the first construction, but which are secured to the intervening link 42 in a different manner. That is, the upper end of the link 42 is secured to the downwardly extending part 43 of the outer member of the upper bearing by a rivet or other suitable connection 44 while the lower bearing 41 is shown as secured to the lower end of the link by a detachable connection which permits the bearing 41 to be attached to the seat 48 so as to remain on the seat while allowing the link 42 to be detached from the bearing. For this purpose, the outer member of the lower bearing 41 may be provided with a headed stud 50 adapted to removably engage in a key hole slot 51 in the adjacent end of the link through the enlarged upper end of which slot the head of the stud is adapted to be inserted and removed.

In the constructions which have been illustrated and described, the antifriction bearings at the opposite extremities of the swinging suspension units have axial holes in their inner members to receive hooks or studs on the seat and frame for attaching the bearings to these parts, but an obvious reversal of this arrangement would be the formation of the inner members of the bearings with appropriate attaching studs or the like.

I claim:

1. In a swing, a stationary frame, a seat, and means for suspending said seat from said frame to swing relatively thereto and including upper and lower bearings each comprising inner and outer annular members with interposed antifriction elements, a link connecting said upper and lower bearings, studs fixed on said frame and seat respectively substantially axially of said bearings and projecting into the central openings of said upper and lower bearings respectively, said bearings being removably retained on said studs and having limited rocking motion thereon transversely of the plane in which the link swings, whereby the maximum effective swinging length of said suspension means is obtained and binding in the bearings due to side sway of the seat is prevented.

2. In a swing, a stationary frame, a seat, and means for suspending said seat from said frame to swing relatively thereto, said suspension means comprising a stud fixed on said frame, a second stud fixed on said seat, a pair of axially apertured antifriction bearings each of which surrounds one of said studs so as to swing about the same and have a limited rocking movement on the stud transversely of the plane in which the link swings, and a separate-part rigid link extending between said bearings and having its ends operatively connected with the swinging members of said bearings by detachable connections constructed to prevent substantial relative movements between said rigid link and said bearings in the direction in which said seat swings, and at least one of said connections being a quick-detachable connection.

CHARLES VALLONE.